P. C. HEWITT.
APPARATUS FOR REGULATING ELECTRIC CIRCUITS.
APPLICATION FILED MAY 12, 1914.
1,321,434. Patented Nov. 11, 1919.
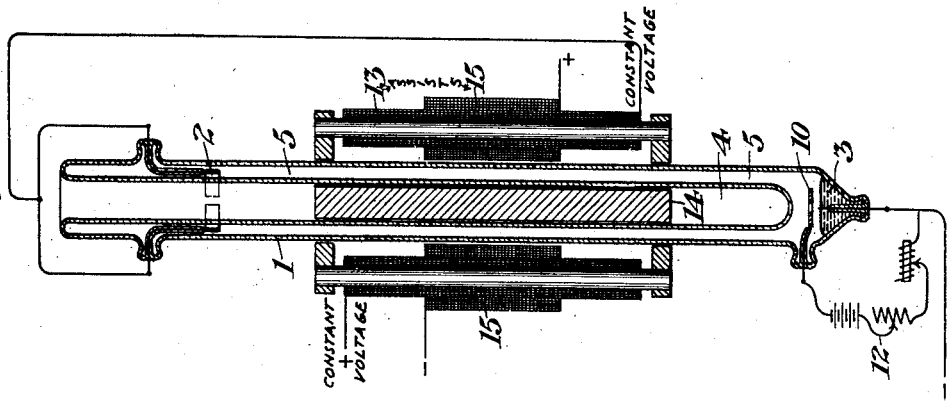
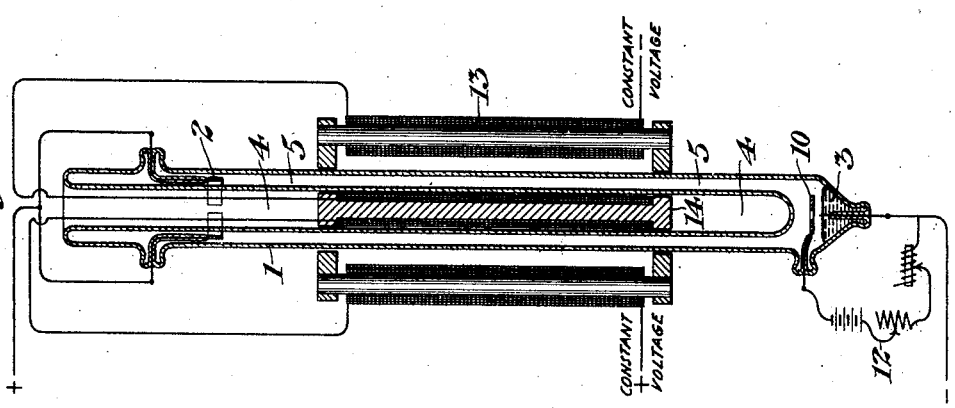
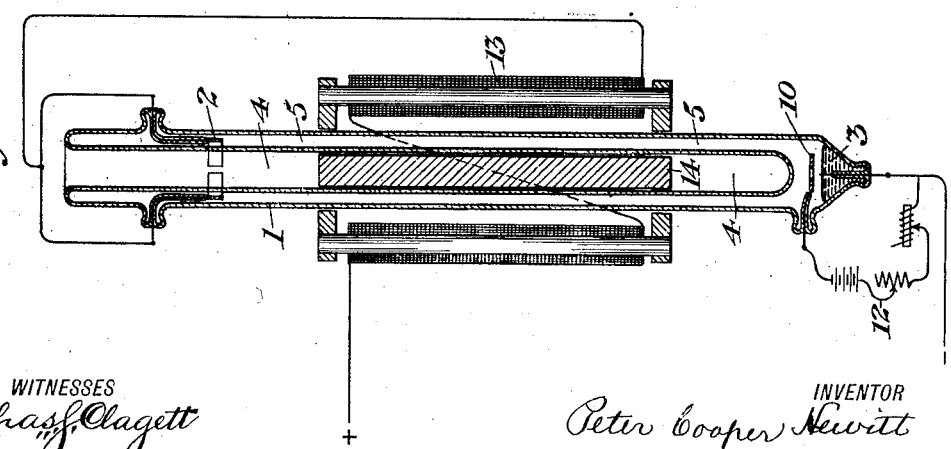
WITNESSES
Chas. F. Clagett
M. E. McNinch
INVENTOR
Peter Cooper Hewitt
BY Gifford Bull
his ATTORNEYS

UNITED STATES PATENT OFFICE.

PETER COOPER HEWITT, OF RINGWOOD MANOR, NEW JERSEY.

APPARATUS FOR REGULATING ELECTRIC CIRCUITS.

1,321,434.      Specification of Letters Patent.      Patented Nov. 11, 1919.

Application filed May 12, 1914. Serial No. 838,034.

*To all whom it may concern:*

Be it known that I, PETER COOPER HEWITT, a citizen of the United States, residing at Ringwood Manor, in the county of Passaic and State of New Jersey, have invented certain new and useful Improvements in Apparatus for Regulating Electric Circuits, of which the following is a specification.

My present invention relates to improvements in electric regulators.

I have discovered that by subjecting the space between the electrodes of a gas or vapor tube, such as, for instance, the now well-known Cooper Hewitt tubes to a magnetic field whereby the electromotive force required to pass current is increased, the tube in running condition will be given a falling electromotive force characteristic, and the electromotive force required to pass current diminishes as the current increases.

I have also discovered that by subjecting the path to the influence of magnetic lines of force and properly constructing and connecting the elements, either the current or the electromotive force, or both, may be controlled or regulated. Since the electromotive force required to pass unit current decreases as the current increases, and increases as the magnetic field increases, it is possible by properly placing, connecting and proportioning the windings of the magnet, or other means for producing such field, to obtain constant current, or constant voltage, or constant watts, or any desired relative variation of current, or voltage, or watts, each with respect to the other.

As examples of my improved regulators, I shall describe three forms, but it will be understood that these are given merely as examples, and that my claims are not limited thereby.

In the accompanying drawings I have shown only electromagnets for producing the desired field of force, but in some cases a permanent magnet may be employed, or a coil of wire may be employed.

While I have shown herein only mercury vapor tubes, it will be understood that any other analogous gas or vapor, or evacuated tube may be employed.

Figures 1, 2 and 3 show similar tubes each provided with a magnet, or other suitable means for impressing a magnetic field on the space between the electrodes.

In all the figures, 1 is a mercury vapor tube. 2 is the positive electrode and 3 is the negative electrode of such tube. The inclosing wall is provided with a reëntrant portion 4, forming an annular space 5 between the electrodes. 10 is an auxiliary "keep-alive" positive electrode, and 12 is an independent circuit supplied with a source of direct current. 13 is an electromagnet arranged so as to impress its field on the space between the main electrodes 2 and 3. 14 is another magnet which, if desired, may be placed within the portion 4 and excited in any convenient manner.

In Fig. 1 the magnet is connected in series with the tube and is so proportioned as to maintain a constant current in the tube and in the circuit. This is due to the fact that the tendency of an increase of voltage is to cause an increased flow of current through the magnet and thus to increase the intensity of the field; but the tendency of an increased intensity of field is to increase the apparent resistance of the lamp so as to decrease the current. By properly proportioning the turns to the characteristic of the lamp it is thus possible to cause a substantially constant current to flow through it, although the voltage of the line may vary within wide limits.

In Fig. 2 the magnets 13 and 14, which are in series, are separately excited from an independent constant voltage source and their field is, therefore, approximately constant. Such an arrangement tends to maintain constant watts in the tube. This is due to the fact that, since the device has a falling electromotive force characteristic, as the current increases, the electromotive force diminishes and, by properly proportioning the magnetic force to the characteristics of the lamp, it is evident that the product of the two may be made to be constant or to approximate such condition.

In Fig. 3 the magnet 15 is separately excited, while the magnet 13 is in series with the tube being so wound as to assist the magnet 15. Such an arrangement tends to maintain constant voltage in the tube and in the circuit. This follows from what has already been said with respect to the arrangements shown in Figs. 1 and 2.

The term "gas or vapor tube" as used in these specifications and in the claims is intended to include all forms of devices which are the equivalent of a mercury tube for the purposes of this invention, irrespective of the contents of the tube, and irrespective of the means employed to keep the negative electrode alive, or to keep the resistance to starting at the negative electrode at a low value. The term, therefore, as used may include, for example, a tube exhausted to any degree, or a suitable current flow in air or other gas, and may include a device in which the negative electrode is kept constantly alive, or in which the resistance to starting at the negative electrode is maintained at a low value, by being highly heated; and may include any path between electrodes controlled mechanically or electrically, where the resistance to starting at the negative electrode is maintained at a low value.

I claim as my invention:

1. An electric regulator comprising in combination a tube having an annular vacuum, gas, or vapor section extending substantially from electrode to electrode of said tube, and an electromagnet in operative relation with said section, the field of which is impressed on the conducting path between the electrodes of said section, and means adapted to supply current to said section.

2. An electric regulator comprising in combination a tube having an annular vacuum, gas, or vapor section extending substantially from electrode to electrode of said tube, and an electromagnet in operative relation with said section, the field of which is impressed on the conducting path between electrodes in said section, and means adapted to supply current to said electromagnet.

In testimony whereof I have hereunto signed my name in the presence of two subscribing witnesses.

PETER COOPER HEWITT.

Witnesses:
L. A. COLEMAN,
R. A. HEWITT.

Copies of this patent may be obtained for five cents each, by addressing the "Commissioner of Patents, Washington, D. C."